United States Patent [19]

Spooner

[11] 4,315,241
[45] Feb. 9, 1982

[54] VISUAL DISPLAY APPARATUS

[75] Inventor: Archer M. Spooner, Orlando, Fla.

[73] Assignee: Redifon Simulation Limited, Crawley, England

[21] Appl. No.: 111,283

[22] Filed: Jan. 11, 1980

[30] Foreign Application Priority Data

Jan. 11, 1979 [GB] United Kingdom ............... 01008/79
Dec. 21, 1979 [GB] United Kingdom ............... 44047/79

[51] Int. Cl.³ ............................................. G09G 3/02
[52] U.S. Cl. .................................. 340/27 R; 340/709; 340/712; 340/724; 358/103; 358/104; 434/44
[58] Field of Search ............... 340/712, 706, 705, 709, 340/27 R, 27 AT, 27 NA, 814, 805, 755; 35/12 G, 12 N, 12 F; 358/103, 104, 250, 88–90; 356/152; 250/203 R; 455/605, 606, 609, 612; 434/38, 43, 44

[56] References Cited

U.S. PATENT DOCUMENTS

| | | | |
|---|---|---|---|
| 3,614,314 | 10/1971 | Rossire | 358/88 |
| 3,632,181 | 1/1972 | Lee | 35/12 N |
| 3,736,564 | 5/1973 | Watkins | 364/200 |
| 3,786,180 | 1/1974 | Macovski | 358/90 |
| 3,851,185 | 11/1974 | Hatsukano et al. | 340/814 |
| 3,892,051 | 7/1975 | Bunker | 434/43 |
| 4,027,403 | 6/1977 | Marsh et al. | 358/93 |
| 4,028,725 | 6/1977 | Lewis | 356/152 |
| 4,048,653 | 9/1977 | Spooner | 35/12 N |

FOREIGN PATENT DOCUMENTS 1527049 10/1978 United Kingdom .......... 340/27 NA

OTHER PUBLICATIONS

Conference: AGARD Lecture Series No. 76 on Electro-Optical Systems, Shepherd, May 1975, pp. 4-1 to 4-13.

Primary Examiner—James J. Groody
Attorney, Agent, or Firm—Larson and Taylor

[57] ABSTRACT

The invention provides head-coupled area-of-interest visual display apparatus particularly for ground-based craft-flight simulators. The apparatus provides binocular, pseudo-collimated vision of a display, projected onto the inside of a part-spherical shell which carries a concave retro-reflective screen and surrounds the pilot. The displayed scene covers an area of interest centered upon the pilot's line of view. The image generator used may be of the computer generated image, laser-scanned model or closed-circuit television type. For the pseudo-collimated display, the same image is projected for left and right eyes from points on a pilot's helmet above the pilot's eye positions. Line scan apparatus is mounted in the pilot cockpit. Line image transmission is by fibre-optic light guide ribbon and two such light guide ribbons are used to restrict impairment of the image by fibre fracture. Common frame scan apparatus is mounted on the pilot's helmet. A sensor measures the pilot's head/helmet movement to permit voluntary scanning of a wide angle of simulated pilot view from the craft.

5 Claims, 5 Drawing Figures

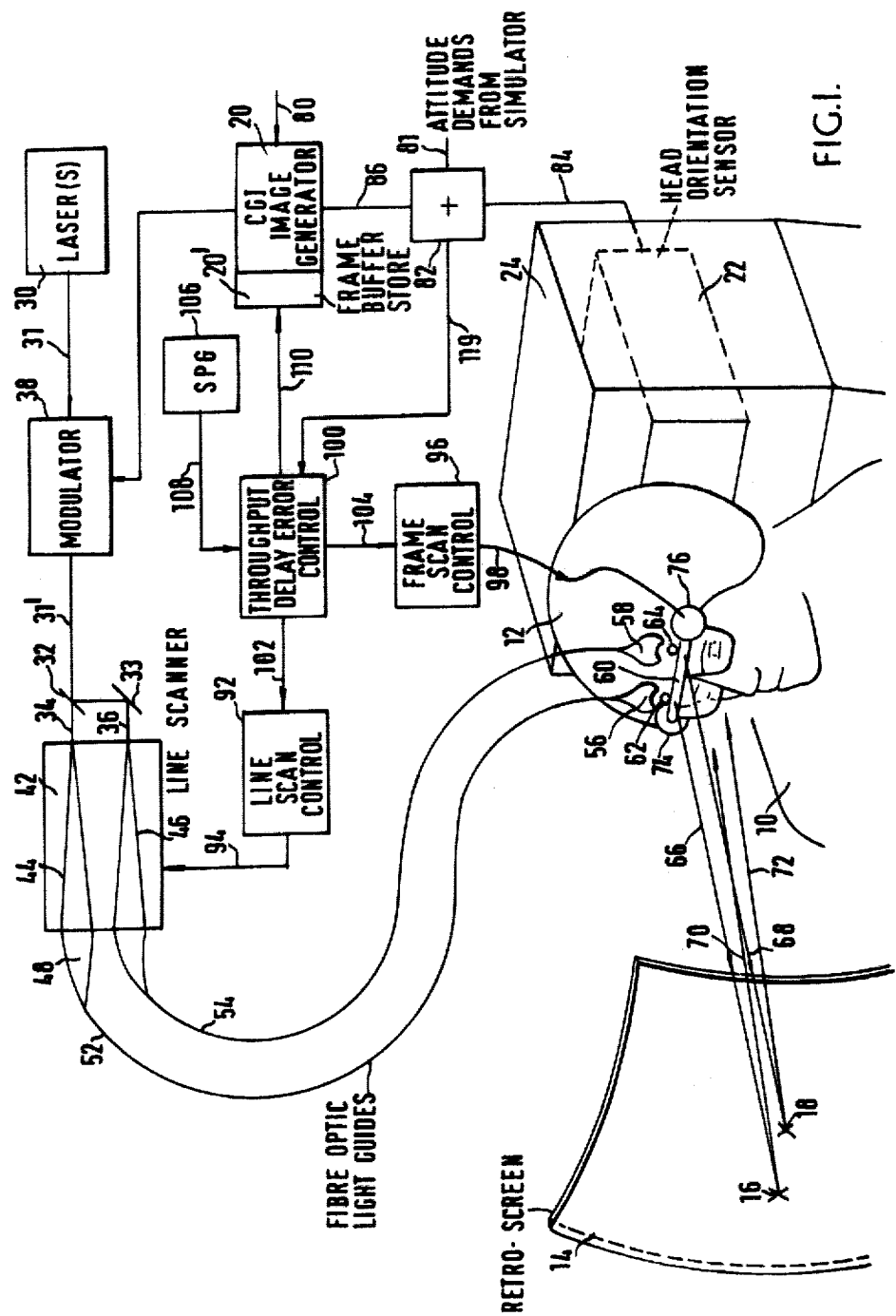

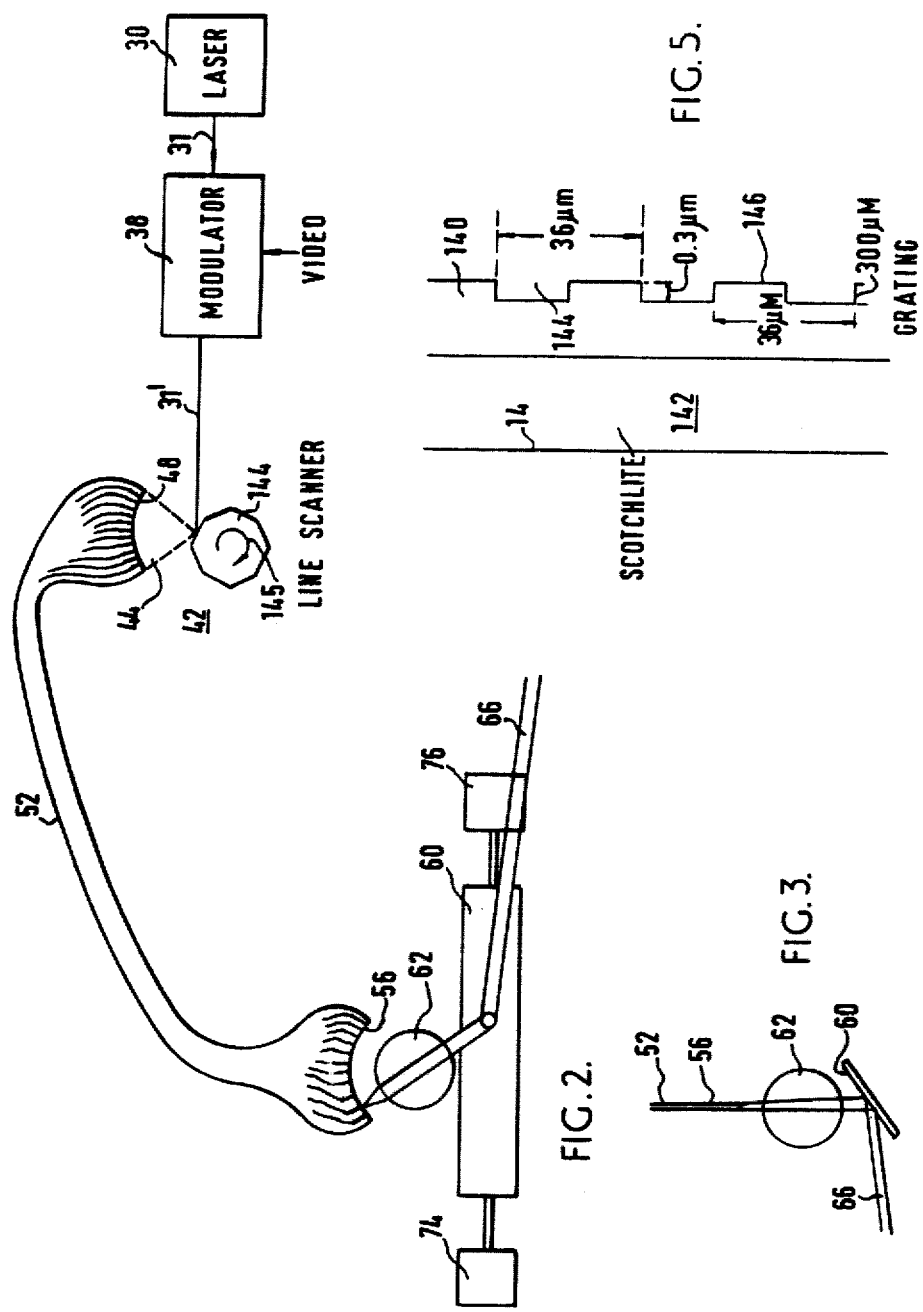

VISUAL DISPLAY APPARATUS

DESCRIPTION

This invention relates to visual display apparatus, particularly for ground-based flight simulators and particularly for providing a display covering a wide-angle field of view. The invention provides such apparatus capable of providing pseudo-collimated viewing for a sole pilot.

The apparatus is of the head-coupled area-of-interest type, wherein an image is projected upon a screen and is appropriate changed both according to the simulated craft position and angular orientation and according to the respective viewer's instantaneous line of view and is simultaneously moved on the screen to occupy the respective viewer's field of view.

Apparatus of this type was described in prior U.K. Pat. No. 1,489,758. Such apparatus provided an area-of-interest display for a sole viewer which was pseudo-collimated, that is, the same image was projected for left and right eyes, so as to appear at infinity.

The present invention is an improvement of such apparatus in which the image projecting means includes a modulated laser beam source, line scanning apparatus mounted in the cockpit of the simulated craft, frame scanning apparatus mounted on a helmet worn by the viewer and line image transmitting means comprising more than one fibre optic light guide ribbon extending between the line scanning and frame scanning apparatus.

Accordingly, the invention provides head-coupled, area-of-interest, visual display apparatus providing pseudo-collimated viewing for one viewer, comprising a part-spherical concave retro-reflective screen positioned for viewing by the viewer, a helmet, sensing means for sensing the orientation of the viewer's head and helmet, visual image generating means for generating a simulated scene in the direction of the viewer's instantaneous line of view according to the viewer's simulated position and orientation and under control of the said sensing means, a laser light beam source, a laser beam modulator, optical beam-splitter means for providing identical left eye and right eye views, separate line scanners for each said view for scanning the modulated laser beam over the input ends of more than one fibre optic light guide, the said fibre optic light guides having their output ends at spaced-apart positions on the viewer's helmet, and frame scanning means mounted on the said helmet for receiving light from the light guide outputs and projecting the light as a scanned image upon the said screen.

SHORT DESCRIPTION OF DRAWINGS

In order that the invention may readily be carried into practice, one embodiment will now be described in detail, by way of example, with reference to the accompanying drawings, in which:

FIG. 1 is a diagrammatic perspective view showing a pilot seated in relation to a part-spherical concave screen for pseudo-collimated viewing of a projected display, with a block schematic diagram of the apparatus used;

FIG. 2 is a diagrammatic view of one laser source and laser beam modulator, line scanner, fibre optic light guide ribbon and frame scanner corresponding to the apparatus used for the right-eye view of the pilot in the view of FIG. 1;

FIG. 3 is a side view of the frame scanner of FIG. 2;

FIG. 5 is a diagrammatic cross-section view in a vertical plane of a part of the screen surface and diffraction grating layer of a modified retro-reflective screen used in the apparatus of FIG. 1.

DESCRIPTION OF THE EXAMPLE

Figure 4:
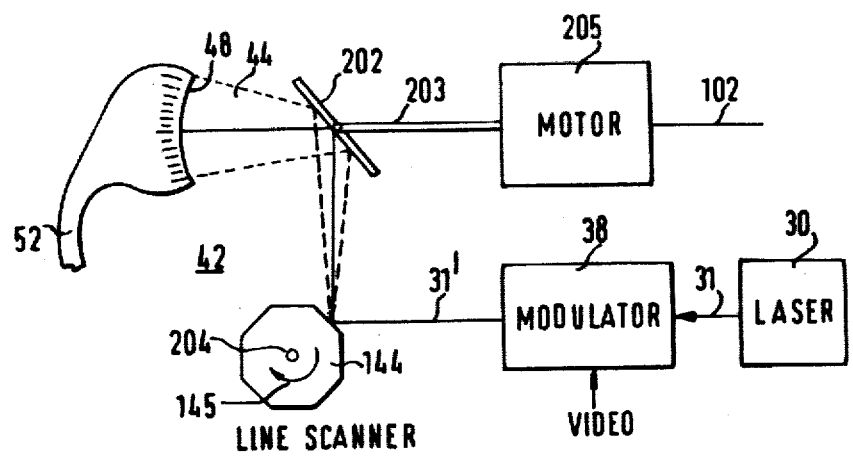
FIG. 4 is a detail view showing an alternative line scanner to that of FIG. 2.

In the accompanying drawings, the same elements are indicated by the same reference numerals throughout.

FIG. 1 shows in diagrammatic form the apparatus according to the invention for generating and displaying a pseudo-collimated area-of-interest view. A pilot 10 wearing a helmet 12 is seated within a part-spherical shell having a retro-reflective interior surface in part represented in FIG. 1 by the concave retro-reflective screen 14. The pilot's line of vision, for right and left eyes and distant viewing, intersects the screen at points 16 and 18, respectively. The field of view for each eye is centered on the respective one of these two points. The views displayed are identical for right eye and left eye but are displaced laterally by the distance between the points 16 and 18 so that the pilot 12 sees a pseudo-collimated view, that is to say, the displayed scene appears to be at infinity and not at the distance of the screen 14. The combined left eye and right eye views will be referred to as the displayed view.

The displayed scene depends, in this example, upon the simulated position of an aircraft during an exercise flight, the attitude of the aircraft, the pilot's seating position in the aircraft and the pilot's instantaneous line of view as determined by the instantaneous orientation of the pilot's head and helmet. The position of points 16 and 18 on the screen 14 and hence the position of the displayed view on the screen depends only on the pilot's head and helmet orientation.

The image required is generated by an image generator 20 of the computer-generated image type which includes a frame buffer memory or store 20'. The pilot's head orientation is sensed by a head orientation sensor 22, which is fixedly mounted within the simulated aircraft cockpit in a mounting 24. The displayed view is projected onto the screen 14, centered in the appropriate locations as two raster-scanned images, the line scan apparatus being cockpit-mounted and the frame scan apparatus being mounted on the helmet 12. Line scan may be either across the screen 14 or up or down. In the present example, line scan is such that the projected scan line upon the screen and the line between the pilot's two eyes both lie in the same plane. The frame scan is orthogonal thereto. Thus, if the pilot's head is upright, line scan is horizontal and frame scan is vertical.

Referring still to FIG. 1, a laser source 30 provides an output laser beam 31 which is directed through a full color modulator 38 to provide a modulated laser beam 31'. The modulated beam 31' is directed through beam-splitter and reflector elements 32, 33 to provide two beams 34 and 36 of equal intensity. The modulator 38 is controlled from the image generator 20 according to the view to be projected. Both modulated beams 34 and 36 pass to a double line scanner 42 fixedly mounted in the simulated aircraft cockpit. The two scanners, described in detail later herein, provide two respective scanned beams 44 and 46 which are respectively scanned over the input ends 48 and 50 of two fibre optic light guide ribbons 52 and 54.

The two fibre optic light guides provide a flexible linkage between the fixed line scanner 42 and the movable helmet 12. The emergent scanned light beams from the respective ends 56 and 58 of the light guides 52 and 54 are focussed by spherical lenses 62 and 64 onto the screen 14 and directed onto a plane mirror 60. The right eye beams are reflected by the mirror 60 along divergent paths to form a scan line, the center of which is shown at 66. Similarly, the left eye beams are reflected by the mirror 60 along divergent paths to form a scan line, the center of which is shown at 68. The center line of the respective right eye and left eye views is thereby formed on the screen 14, each line having its respective mid point at 16 and 18 and being viewed by the pilot 10 in the respective line of view 70 and 72.

The mirror 60 is long in relation to its width and is carried in bearings at its end which are mounted on the helmet 12. These bearings are provided by motors 74 and 76 at the two ends which move the mirror 60 to provide the required frame scan.

The mirror 60 may be a single plane mirror which is either oscillated or rotated by the motors 74, 76 on its axis parallel to the plane in which the line scan is projected, or the mirror 60 may be a multi-faceted polygon mirror rod of, for example, octagonal cross-section which is continuously rotated by the motors 74, 76. In the present example, the mirror 60 is a single plane mirror and is rotationally oscillated for frame scan.

As the pilot's head moves, so does the displayed view move over the screen, so as to be in the pilot's new line of view and the view itself is changed according to the simulated real world view in the direction of the line of view.

To this end, the visual system receives data from the host flight computer on lines 80 and 81. Position data defining the simulated aircraft position throughout a simulated flight exercise is supplied to the image generator 20 on line 80. Attitude data, defining the simulated aircraft instantaneous attitude, is supplied on line 81 to a vector summing unit 82 together with head orientation data, defining the pilot's actual instantaneous line of view, on line 84. The summed output is supplied to the image generator 20 on line 86. A throughput delay error signal, obtained by subtracting the head attitude input to the image generator one throughput delay period ago from the current head attitude position, is supplied to the throughput delay error control unit 100 on line 119.

The duplicated image, respectively for the right eye and left eye views, in accordance with the inputted data, and allowing for the known seating position of the pilot in the simulated aircraft type, are supplied to the respective modulators 38 and 40 on lines 88 and 90.

It will be appreciated that the change of the displayed image with simulated aircraft position is relatively slow. However, the change of the displayed image with head orientation is complete and relatively very rapid. The image generator is unable to compute an entirely new image immediately a new line of view is established due to the throughput delay of the image generator computer. To overcome this limitation the residual "old" displayed view is derotated to its former screen position until the computed new displayed view is available.

The required image derotation is effected by controlling the relationship between the video signal and the line scan and frame scan positions.

This control can be produced in a number of ways. The line scanner is typically a continuously rotating polygon mirror which sweeps the input laser beam or beams through an arc to produce a line scan, as in the example of FIG. 2. Three alternatives are available:

(i) If the video signal is produced at a constant rate then the line scan drive may be phase modulated to maintain the correct line in space to produce an image with the correct spatial orientation. If the line projection system is capable of transmitting only the displayed field of view, then the image size will only be that part which is common to both the computed and projected images. If the fibre optic ribbon and the projection system is capable of projecting more than the required field of view in the line scan direction then the field of view obtained may be held constant.

(ii) The video signal may be produced at a constant rate and the line scanner rotated at a constant rate. The required angular shift may then be introduced with a supplementary mirror. Line scanning apparatus, alternative to that of FIG. 2 and including such a supplementary mirror, is described later herein with reference to FIG. 4.

(iii) The polygon mirror may be run at a constant angular velocity and the video signal timing adjusted by altering the time at which the video signal is read out of the frame memory or store 20' of the image generator 20. This ensures that the video signal corresponding to a point in space is produced at the predetermined time that the scanner points the light beam at that part of the screen representing the required point in space.

Of these three methods described above, method (i) involves the phase modulation of a mechanical system rotating at high speed and has the disadvantages associated with the inertia and response times of such a system. Method (ii) overcomes some of these problems by using a supplementary mirror. This mirror does not rotate at high speed but nevertheless has inertia inherent in any mechanical system and so it will have some response time. Method (iii) requires only the ability to read out a memory at controlled times. Since a memory is not a mechanical system, it has no inertia and can be read out in a discontinuous manner if required. Accordingly, method (iii) is the preferred method for line scan synchronization in the present invention.

The frame scanner of FIG. 1 does not offer the same options as does the line scanner, due to the difficulties of implementation. The alternative methods corresponding to those described for the line scanner are as follows:

(i) If the video signal is produced at a constant rate then the frame scan driver may be controlled to give the required pointing direction. In this case the frame scanner will be a position servomechanism driven by a sawtooth wave form in which the starting point of the ramp may vary in a controlled manner and the slope of the ramp may vary in a controlled manner in order to give a constant angular sweep in free space when the projector mount is being subjected to angular shifts.

(ii) The use of a supplementary mirror is impractical in the frame scanner of FIG. 1.

(iii) If the frame scanner is driven with a sawtooth of constant period, start point and slope, then the read out times from the frame memory or store 20' may be adjusted to produce the video signal when the scanner is at the required orientation in free space.

Of these three methods, method (i) requires adjustments to the period and rate of a mechanical system which, due to its construction has a very low inertia. Hence, the settling time following such a disturbance may be acceptable. It can preserve the instantaneous field of view constant through the throughput delay period. Method (ii) is impractical due to the physical constraints of the projection line and frame scanner assembly of FIG. 1. Method (iii) involves adjustment to a system without inertia or the requirements of continuity. However, method (iii) reduces the virtual field of view during the throughput delay period.

Continuing with the description of the apparatus of FIG. 1, a synchronizing pulse generator 106 supplies pulses on line 108 to the throughput delay error control unit 100.

Line scan control signals are supplied to the line scanners of unit 42 from unit 92 by way of line 94. Frame scan control signals are supplied to the frame scan motors 74, 76 from unit 96 by way of a flexible line 98. Video synchronization timing pulses are fed to the frame buffer 20' of the C.G.I. image generator 20, from the unit 100 on line 110. Control of the relative timings between the line scan control 92, the frame scan control 96 and the C.G.I image generator frame buffer memory 20' is effected by the throughput delay error compensation circuit 100 by way of lines 102, 104 and 110, respectively.

It will be noted that the projection middle lines 66 and 68 do not coincide with the lines of view 70 and 72 for the reason that projection is effected from above the pilot's eyes. Projected onto any horizontal plane, the respective lines are coincident but, projected onto any vertical plane, the respective lines diverge away from the screen. The angle of divergence is small but is nevertheless great enough, compared with the apex angle of the half-brilliance cone of reflection of a retro-reflective screen material to result in a viewed scene of much reduced brilliance. It is preferred therefore to use a screen of modified retro-reflective material for which the axis of the half-brilliance cone of reflection is depressed downwardly by the angle between the projection lines 66, 68 and the line of view lines 70, 72.

The various units of the apparatus, shown in the block schematic part of FIG. 1, will now be considered in further detail in the following order:
C.G.I. Image Generator.
Laser Source.
Laser Beam Modulator.
Line Scanner.
Fibre Optic Light Guide Ribbon.
Frame Scanner.
Retro-reflective Screen.
Helmet-Head Orientation Sensor.
Throughout Delay Error Compensation Unit.
Line Scan Control.
Frame Scan Control.

C.G.I. IMAGE GENERATOR

The displayed view corresponds to a real world view as it would be visible from the simulated aircraft during flight. In earlier visual display apparatus for ground-based simulators, the visual image was generated using a scale model and a closed-circuit television camera. The camera lens, comprising an optical probe, was moved over the model correspondingly to the aircraft simulated position, altitude, heading, pitch and roll. The generated image was varied according to all these factors.

According to a more recent technique, now well established, the same form of image is computer-generated. The technique is explained in text books such as, for example, "Principles of Interactive Computer Graphics", by William M. Newman and Robert F. Sproull, published in 1973 by McGraw-Hill Book Company, New York and elsewhere.

The signals available to the image generator computer from the host flight computer of the simulator are: aircraft position, X.Y., altitude, heading, pitch and roll. C.G.I. image generators are known which generate the direct ahead view from the aircraft according to the input data, including solid-looking features which surface detail, concealing hidden edge-lines and surfaces as the aircraft flies around such objects and clipping and windowing the display according to the simulated field of view.

The image generator 20 of FIG. 1 is of this general type. Aircraft position and attitude data are supplied from the host flight computer on line 80. Aircraft heading, pitch and roll data are supplied on line 81.

However, the image generated in the apparatus of FIG. 1 is in the actual instantaneous line of view of the pilot. This view is determined also by the pilot line of view heading and pitch and head roll relatively to the aircraft axes. Head azimuth, head pitch and head roll are determined by the head orientation sensor 22 and these data are supplied on line 84 to the summing unit 82, which adds these values to the aircraft heading, pitch and roll values respectively. The output information defining the pilot's line of view relatively to the simulated terrain overflown is supplied to the image generator 20 on line 86.

The point midway between the pilot's eyes is a constant position offset above and to the left of the aircraft longitudinal axis. This offset requires only constant values to be added to aircraft altitude and position respectively throughout an entire exercise.

The identical image for right eye and left eye is computed digitally and stored in the buffer, memory store 20', which is then read out to provide the required image data at the required time, under control of the control unit 100.

It will be appreciated that, at cruising altitudes the offsets for pilot's seating position in the aircraft are of small importance. However, for runway, near-ground and near-target maneuvers, they are of great importance.

LASER SOURCE, LASER BEAM MODULATOR, LINE SCANNER, FIBRE OPTIC LIGHT GUIDE RIBBON AND FRAME SCANNER

One laser source, laser beam modulator, line scanner, fibre optic light guide ribbon and frame scanner elements of the apparatus will be described together with reference to FIG. 2 and FIG. 3.

FIG. 3 shows the laser beam source 30 which provides the output laser beam 31 directed through the full color modulator 58. Both the laser beam source 30 and the modulator 38 are of known form. The full color modulated beam output is shown at − in this figure, in which intermediate beam-splitters are not shown. The line scanner is shown generally at 42.

The line scanner comprises a synchronously-driven polygonal section mirror drum 144 which rotates continuously in the direction shown by the arrow 145 to sweep the beam 31' over the scan path 44. One pass occurs for the movement of each mirror facet of the mirror drum 144 past the beam 31'.

A fibre optic light guide, formed into a flat ribbon 52 over most of its length, has individual groups of fibres formed into an arc at the input end 48 of the light guide. The width of the line scan 44 exactly covers the arc at 48, so that the modulated beam 31' is scanned along the arc at 48 for each line of the image.

At the output end 56 of the fibre optic light guide 52, the individual groups of fibres are similarly formed into an arc the fibre groups occurring in the same sequence at the two ends 48 and 56, so that the scanned image line at the input end 48 is exactly reproduced at the output end 56.

The emergent rays from the output end 56 of the light guide 52 are focussed by the spherical lens 62 onto the face of the frame scanning mirror 60. As shown in FIG. 1, the mirror 60 is mounted on the pilot's helmet 12 in bearings provided by reciprocating motors 74 and 76.

With the mirror 60 stationary, the emergent rays are reflected from the mirror 60, as shown instantaneously at 66, to form a single line of the image. As the mirror 60 is moved, successive lines of the image are projected to form the entire scanned image.

FIG. 3 shows, in side view, the output end 56 of the light guide 52, the spherical lens 62, the mirror 60 and the reflected beam 66 as described above with reference to FIG. 2.

A second line scanner, comprising a second mirror drum, produces a second line scan over the input end 50 of the second fibre optic light guide 54, as is shown in FIG. 1. The output end 58 of this second light guide 54 provides emergent rays which are focussed by a second spherical lens 64 onto the same reciprocating mirror 60. The two helmet mounted optical systems, with the common frame scan mirror 60, together provide the right eye image and left eye image of the pilot's displayed view. As already explained, the identical right eye and left eye images provide the pseudo collimated display for the pilot.

FIG. 4 shows line scanning apparatus alternative to that of FIG. 2 and including a supplementary mirror 202. The mirror 202 is pivotable on an axis 203 which is parallel to the spin axis 204 of the polygon mirror line scanner 144.

To effect image derotation for head movement in the direction of line scan by the method (ii) described earlier, the mirror 202 is rotationally positioned about its axis 203 by a motor 205 in a controlled manner so that the swept arc 44 is positioned at the required part of the arc 48 at the input end of the fibre optic light guide 52. The motor 205 is controlled from the throughput delay error control unit 100 by a signal on line 102.

MODIFIED RETRO-REFLECTIVE SCREEN

Retro-reflective projection screen material such as that sold under the name SCOTCHLINE (Registered Trade Mark) has a reflection characteristic such that light incident upon the screen is mostly reflected back along the line of incidence. That is to say, reflected light is brightest on the line of incidence, falling in intensity rapidly as the eye is displaced from the line of incidence in any direction. With one retro-reflective material, observed brightness falls to one-half intensity at an angle of 0.8° displacement from the line of incidence. Stated in other words, the area of half-brightness is the surface of a cone having its axis on the line of incidence and having a half-angle of 0.8° at its apex.

In the projection apparatus described with reference to FIG. 1, the line of incidence 66, between the frame scanner 60 and the screen 14, makes an angle which is also approximately 0.8° with the line of view 70, between the screen 14 and the eye of pilot 10. Thus, with an unmodified retro-reflective screen, the projected image would be seen at half-brightness by the pilot.

In the apparatus of the invention, it is preferred to modify the reflection characteristic of the screen in order to increase the brightness of the projected image on the pilot's line of view. This modification is effected by placing a diffraction grating in front of the screen surface. FIG. 5 shows one suitable construction.

In FIG. 5, which is a section view in the vertical plane including both the line of incidence 66 and the line of view 70, the surface of the retro-reflective screen is shown at 14. Placed in front of the screen 14 is a diffracting layer 140 of material having a refractive index of 1.5.

The layer 140 is separated from the screen 14 by a layer of air 142. Neither the depth of the layer of air 142 nor that of the refracting layer 140 is critical but both may be of the order of 10 to 100 mm.

The front face of the refracting layer 140 is formed into a diffraction grating of horizontal grooves 144, leaving horizontal lands 146. The width of the grooves 144 and lands 146 is approximately equal. Calculated for light of 550 nm., and a refractive index of 1.5, the depth of the grooves 144 is 0.3 mm., and the spacing of the grooves is 36 mm., in the vertical direction, as shown in the drawing.

The modified reflection characteristic of the composite retro-reflective surface and diffraction layer, in the plane of the drawing, is that the light reflection along the line of incidence is reduced to a value of about 90% of that for the unmodified screen. The 10% of light not reflected along the line of incidence is distributed at angles above and below the line of incidence corresponding to first- and higher-diffracted orders. Of these, the brightest are the two at the angle of 0.8° above and below the line of incidence. That one which is 0.8° below the line of incidence is along the line of view. By this means, the projected image brightness along the line of view is significantly increased.

In an alternative construction of the diffraction grating, not illustrated in the drawings, the front face of the refracting layer 140 is serrated in cross section, so that a greater proportion of the diffracted light is directed downwardly to the pilot's eyes.

HEAD/HELMET ORIENTATION SENSOR

Mechanical linkages have been proposed to sense the orientation of a pilot's helmet relatively to an aircraft cockpit. However, mechanical arrangements of any sort are undesirable in the environment of an aircraft simulator cockpit.

It is preferred to effect helmet orientation sensing by non-contact means. Any suitable known head/helmet orientation sensor may be used in apparatus of the present invention to provide electrical signals defining instantaneous helmet orientation. One such sensor is that described by R. G. Stoutmeyer and others in U.S. Pat. No. 3,917,412, entitled "Advanced Helmet Tracker Using Lateral Photodetection and Light-Emitting Diodes". Such apparatus is further described by Edgar B. Lewis in U.S. Pat. No. 4,028,725, entitled "High-Resolution Vision System".

THROUGHOUT DELAY ERROR COMPENSATION UNIT, LINE SCAN CONTROL AND FRAME SCAN CONTROL

As has been explained earlier in the description, the C.G.I. image generator 20 takes an appreciable time to compute a new view for display when the pilot's line of view is changed. The delay is of the order of 100 m secs. However, when any viewer changes his line of view, by extensive head movement, there is a delay before the viewer appreciates the new view before him. This delay also is of the same order of time as the image generator delay.

In a simplified form of the apparatus according to the invention means are provided merely to ensure that the old display is not projected in the new line of view of the changed head position.

In this simplified form of the apparatus, a large change of head orientation signal on line 119 is effective to blank out the projected view for a period of some 100 m secs. until the new view has been computed.

The apparatus of FIG. 1 provides means for the derotation of the projected image upon rotation of the pilot's head. Derotation is considered to be of special importance when head movement is such that the new field of view is not separate from the old field of view but is within it or overlaps it.

The displayed view is some 100° in azimuth and some 70° in elevation, with respect to the pilot's line of view. Although a viewer's field of view may exceed these angles, the marginal areas are low-interest and the central area of prime-interest may be a cone of perhaps only 5° about the line of vision. It is therefore readily possible for the pilot to change his line of view so as to move this area of central interest within the initial displayed view area.

In the apparatus of FIG. 1, line scan is in a direction across the screen 14 and frame scan is orthogonal thereto. The head orientation sensor 22 provides signals resolved into head azimuth movement and head pitch movement.

The synchronizing pulse generator 106 provides a line synchronizing and frame synchronizing pulse output of equally spaced apart pulses. Upon change of head azimuth, the output signal on line 119 causes the throughput delay error control unit 100 to provide a relative change of phase of the line synchronizing pulses supplied by control unit 92 to the line scanner 42, and the video synchronizing pulses supplied on line 110 by the throughput delay error control unit 100 to the frame buffer store 20', so controlling read out from the store 20' in the sense to displace the displayed image equally and oppositely to every change of head azimuth.

Similarly, the output signal on line 119 causes control unit 100 together with frame scan control unit 96 to provide a relative change of phase of the frame synchronizing pulses supplied by control unit 96 to the frame scanning motors 74 and 76.

Thereby, upon head rotation in azimuth or pitch or both, the displayed view is displaced oppositely. The derotation is maintained for a period of some 100 m secs., until the new view is computed. The original relative timing of the synchronizing pulses is then restored, so that the new view is displayed in the direction of the new line of view.

I claim:

1. Head-coupled, area-of-interest, visual display apparatus providing pseudo-collimated viewing for one viewer, comprising a part-spherical concave retro-reflective screen positioned for viewing by the viewer, a helmet, sensing means for sensing the orientation of the viewer's head and helmet, visual image generating means for generating a simulated scene in the direction of the viewer's instantaneous line of view according to the viewer's simulated positioned and orientation and under control of the said sensing means, a laser light beam source for producing laser beams, a laser beam modulator for modulating said laser beams, optical beam-splitter means for providing identical left eye and right eye views, separate line scanners for each said view for scanning the modulated laser beams over the input ends of more than one fibre optic light guide, the said fibre optic light guides having their output ends at spaced-apart positions on the viewer's helmet, and frame scanning means mounted on the said helmet for receiving light from the light guide outputs and projecting the light as a scanned image upon the said screen.

2. Head-coupled, area-of-interest, visual display apparatus as claimed in claim 1, in which the visual image generating means is of the computer-generated image type.

3. Head-coupled, area-of-interest, visual display apparatus as claimed in claim 2, for a ground-based craft flight simulator including a flight computer, in which the computer-generated image generating means is provided with input signals from the craft flight computer defining craft position and is also provided, by way of a summing unit, with input signals from the craft flight computer defining craft attitude and with input signals from the said sensing means defining the viewer's head attitude.

4. Head-coupled, area-of-interest, visual display apparatus as claimed in claim 3, wherein the computer-generated image generating means is of a form subject to perceptible delay in computing said simulated scene upon change of viewer's instantaneous line of view from a first line of view to a new line of view, including throughput delay error compensation means which is supplied with an input signal from the viewer's head and helmet orientation sensing means and is operative to control the line scanner and the frame scanning means so as to project the scanned image upon the screen in said first line of view for the period of said delay.

5. Head-coupled, area-of-interest visual display apparatus as claimed in claim 1, in which the retro-reflective screen has a reflective characteristic such that it reflects a lesser proportion of light along the line of incidence from the frame scanning means to the screen and a greater proportion of light along the viewer's line of view from the screen to the viewer's eyes.

* * * * *